March 13, 1962 W. J. READING 3,024,889
AUTOMATIC EGG ORIENTORS
Filed March 20, 1959
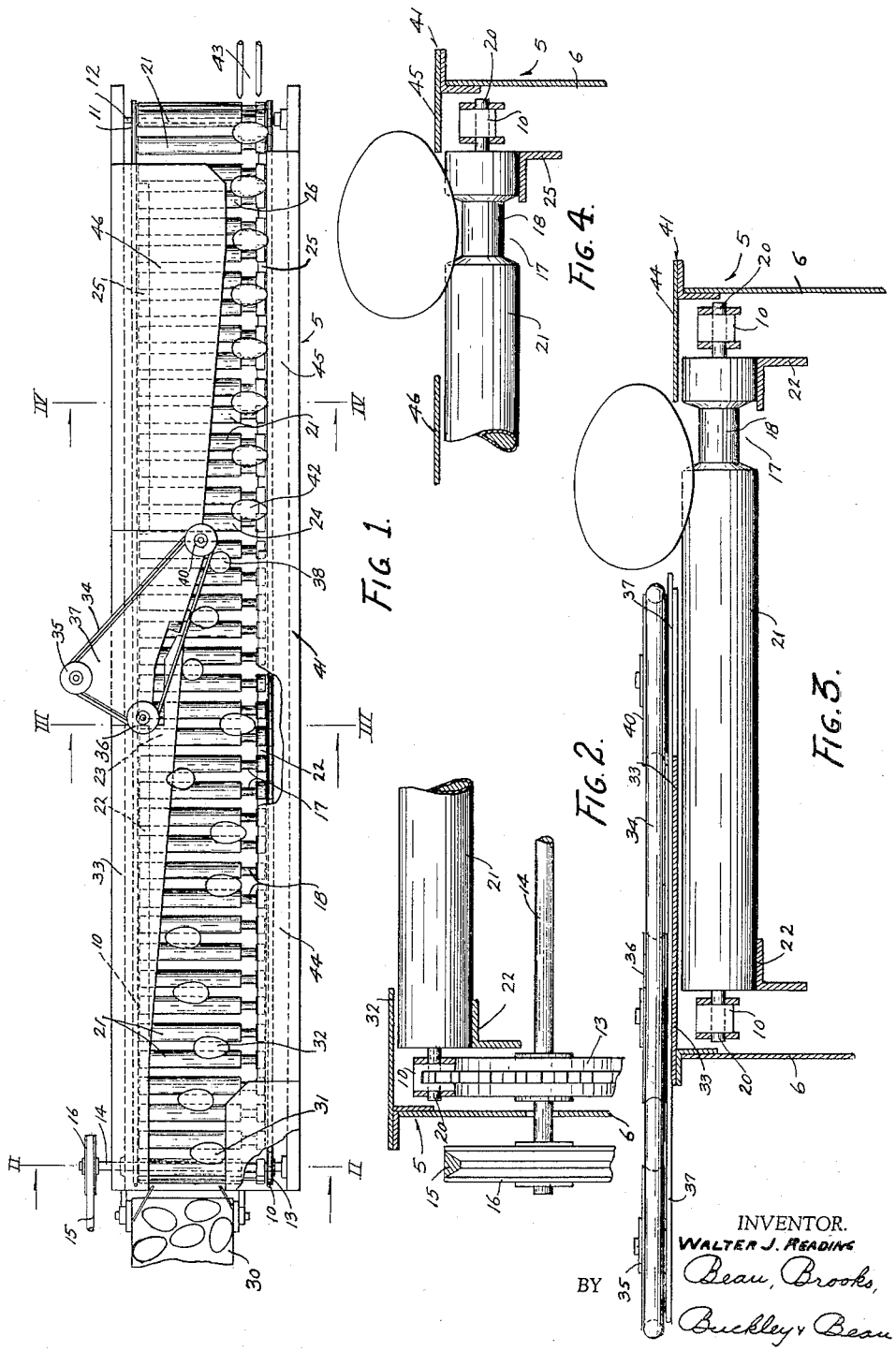
INVENTOR.
WALTER J. READING
BY Beau, Brooks,
Buckley & Beau
ATTORNEYS

United States Patent Office 3,024,889
Patented Mar. 13, 1962

3,024,889
AUTOMATIC EGG ORIENTORS
Walter J. Reading, Agency Road, R.R. 1, Ottumwa, Iowa
Filed Mar. 20, 1959, Ser. No. 800,699
2 Claims. (Cl. 198—33)

My invention relates in general to means for orienting articles of ovoid shape, and in particular for means for orienting eggs.

The principal object of my invention is to provide means for receiving eggs disposed at random and for automatically orienting them to a common position.

Another object is to provide means for feeding all of the eggs being handled in a predetermined position by turning the eggs which are disposed in disoriented positions.

A further object is to provide an orienting device having a plurality of spaced parallel rollers movable in a direction normal to their axes for feeding the eggs through the orientor.

Another object is to provide means for rotating the rollers on their axes during only a portion of their travel through the orienting means.

Another object is to provide rollers each having a groove or saddle at one end thereof for cradling the eggs when in final predetermined position, thereby restraining further movement endwise upon the rollers.

The above objects and advantages have been accomplished by the device shown in the accompanying drawing, of which:

FIG. 1 is a plan view of the invention;

FIG. 2 is an enlarged fragmentary view thereof, taken on line II—II of FIG. 1;

FIG. 3 is an enlarged sectional view taken on line III—III of FIG. 1; and,

FIG. 4 is an enlarged fragmentary view taken on line IV—IV of FIG. 1.

My device comprises a support frame 5 having side plates 6 along each longitudinal side thereof. Extending along each longitudinal side of the frame is a sprocket chain 10. These chains are supported at one end by sprocket wheels 11 carried by a shaft 12 mounted in suitable bearings supported by the side plates. The chains are supported at the other end of the table by sprocket wheels 13 disposed upon a drive shaft 14 mounted in suitable bearings carried by the side plates of the table. The shaft 14 is preferably driven by any suitable means (not shown) through the medium of a belt 15 and pulley 16 mounted upon the shaft.

A plurality of spaced orienting rollers 21 are disposed between the chains 10, and each roller is pivotally mounted upon inwardly extending pivot pins 20 carried by the chains for unidirectional rotation thereof. If desired, the rollers may be covered with some suitable resilient material, such as rubber. The ends of the rollers at the front side of the frame are each formed with a groove or saddle 17 provided by a reduced diametrical portion 18. Carried by the frame 5 and arranged at each side of the side plates 6 is an entering roller ledge 22. Each of these roller ledges extend longitudinally of the table for a portion of its length and they are so positioned that the rollers are supported upon the ledges in their passage thereover thereby causing the rollers to rotate upon the pivot pins 20. These ledges extend from the entering end of the table to substantially the position occupied by the roller 23, shown in FIG. 1, and aligned with the ledges 22 are discharge ledges 25 which are spaced from the entering ledges. Therefore, when traveling from the position occupied by roller 23 toward the discharge end of the frame, the rollers will not be rotated upon their pivots but will be carried along with the sprocket chains in stationary manner until they reach the advance ends of the discharge ledges or to that position which is occupied by roller 24 whereupon rotation of the rollers will be resumed and will be continued until a position is reached which is substantially that occupied by roller 26. From the position occupied by roller 26, the rollers will be carried along to the end of their longitudinal travel in stationary manner.

The eggs to be oriented are fed to the orientor by means of a feeding belt 30 of any suitable design. From the belt 30 the eggs are deposited in disoriented positions upon the rollers in such manner that they occupy substantially each alternate space between the rollers. As the eggs are being indiscriminately fed upon the rollers they will align themselves with their major axes parallel with the axes of the rollers and the eggs which are disposed with their smaller ends extending rearwardly toward the back of the frame, as for instance egg 31 in FIG. 1, will travel along in the spaces between the adjacent coacting rollers in a rearward direction, whereas those eggs which are positioned with their smaller ends outwardly toward the front of the orientor, as for instance egg 32, will travel in a forward direction. Since it is necessary, in order to further process the eggs, that they be oriented in a common position, those eggs which are improperly positioned must be turned about. In order to accomplish this turning movement, the eggs like those positioned at 31 will travel rearwardly and will come into contact with a guide plate 33. This guide plate is carried by the frame 5 just above the rollers and it has its forward edge tapered as shown in FIG. 1 and it serves to cause the eggs to be tilted as their small ends ride up against the edge of the plate until they turn over with their small ends pointed forwardly, whereupon they will travel axially over the rollers and into the saddles thereof. In the event that these improperly oriented eggs reach the end of the guide plate 33 without being turned over in end-to-end manner as explained hereinabove, their axial position will be reversed by contact with a traveling turning belt 34. This belt which is preferably round is passed over a drive sheave 35 and two idler sheaves 36 and 40 mounted upon a plate 37 carried by the guide plate 33 and is driven at substantially the same speed as the feeding movement of the rollers. The sheaves are so located that the passage of the belt between idlers 36 and 40 will be disposed closely to the upper surfaces of the rollers. As the improperly disposed eggs touch the belt the smaller ends thereof are gradually tilted upwardly until they are in the position occupied by the egg 38 at which time the egg will be rolled over to the position occupied by the egg 42. The rolled-over eggs will be carried forwardly upon the stationary rollers in the space between the adjacent ends of the entering and discharge roller ledges 22 and 25, respectively, until the rollers reach the forward ends of the ledges 25 whereupon they will resume their rotation which will cause the eggs to travel in axial direction to the forward ends of the rollers and to be cradled in the saddles or grooves 17 formed therein. As shown in FIG. 1, an abutment plate 41 extends along the front of the machine and is provided with a wide portion 44 and a narrow portion 45. The wide portion extends from the entering end of the orientor to substantially the position occupied by the roller 24 in FIG. 1. The width of this portion of the plate is such that the edge thereof is substantially coincident with the outer edge of the saddles so that the eggs cannot fall into the saddles until they have reached the narrow part 45 of the plate as shown in FIG. 4. The narrow portion of this plate is so proportioned that the inner edge is substantially coincident with the outer ends of the rollers, whereby eggs having reached this point in their travel will drop into the saddles where they will remain until they reach the discharge end of the device.

The turning belt is arranged adjacent the space between the roller ledges 22 and 25 in which space the rollers are carried along in a non-rotating manner. From the end of the discharge roller ledges 25, the rollers are again carried along in non-rotating manner and the eggs supported thereby are then transferred by means of suitable conveyors 43 to any desired processing apparatus (not shown). A cover plate 46 extends forwardly from the rear edge of the frame at the discharge end thereof.

What is claimed is:

1. An orientor for ovoid shaped articles, comprising a support frame, a plurality of individually mounted parallel spaced article-supporting rollers carried by said frame, means for moving said rollers relatively to said frame in a direction normal to their axes, pivot means carried by said moving means for mounting said rollers for individual unidirectional rotation, entering roller ledges carried by said frame, aligned discharge roller ledges carried by said frame and having their adjacent ends spaced apart from the ends of said entering ledges, said rollers being in rolling contact with said ledges for causing rotation of said rollers, said rollers being non-rotatably carried by said moving means during their travel across said space, each of said rollers being of substantially uniform diameter throughout its length and being formed near one end thereof with a saddle formed by a reduced diametrical portion spaced from the outer end thereof, means delivering ovoid articles to said rollers in random attitude whereby said articles settle into cradled positions between said rotating rollers in disoriented relation, and means disposed in the travel of the rollers to intercept said articles when traveling in a direction axially away from said saddles to turn said intercepted articles and thereby cause them to travel in the opposite direction and to become cradled in the saddles of said rollers, the last mentioned means including an endless belt having a flight thereof spaced above said rollers and bridging the gap between said entering roller ledges and said discharge roller ledges, said flight extending angularly relative to the linear path of said rollers to be spaced closer to said saddles in the region of said discharge roller ledges to overturn misoriented articles for ultimate disposition in said saddles, and means for driving said belt in the direction of roller travel and at a speed substantially corresponding with the linear speed of the rollers.

2. The orientor according to claim 1 wherein said last mentioned means also includes a guide plate extending from adjacent the inlet end of the orientor to said endless belt and having an inner edge overlying said rollers and extending angularly with respect to the linear travel of said rollers.

References Cited in the file of this patent

UNITED STATES PATENTS

| | | |
|---|---|---|
| 2,460,212 | Bickley | Jan. 25, 1949 |
| 2,642,212 | Currivan | June 16, 1953 |
| 2,895,589 | Rostron | July 21, 1959 |

FOREIGN PATENTS

| | | |
|---|---|---|
| 777,330 | France | Feb. 16, 1935 |